United States Patent
Seibert et al.

(10) Patent No.: US 9,892,548 B2
(45) Date of Patent: Feb. 13, 2018

(54) LIGHTING SIMULATION ANALYSIS USING LIGHT PATH EXPRESSIONS

(71) Applicant: NVIDIA Corporation, Santa Clara, CA (US)

(72) Inventors: Daniel Johannes Seibert, Berlin (DE); Stefan Radig, Brandenburg (DE); Matthias Raab, Berlin (DE); Carsten Alexander Waechter, Berlin (DE); Lutz Kettner, Berlin (DE); Alexander Keller, Berlin (DE); Dirk Gerrit van Antwerpen, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 133 days.

(21) Appl. No.: 14/820,491

(22) Filed: Aug. 6, 2015

(65) Prior Publication Data
US 2016/0042559 A1   Feb. 11, 2016

Related U.S. Application Data

(60) Provisional application No. 62/035,354, filed on Aug. 8, 2014.

(51) Int. Cl.
*G06T 15/50* (2011.01)

(52) U.S. Cl.
CPC ........ *G06T 15/506* (2013.01); *G06T 2210/04* (2013.01)

(58) Field of Classification Search
CPC ..................... G06T 15/06; G06T 15/50–15/55
See application file for complete search history.

(56) References Cited

U.S. PATENT DOCUMENTS

| 2009/0225081 | A1* | 9/2009 | Keller | G06T 15/40 345/426 |
| 2010/0060639 | A1* | 3/2010 | Breton | G06T 15/50 345/426 |
| 2012/0299921 | A1* | 11/2012 | Budge | G06T 15/506 345/426 |
| 2014/0313198 | A1 | 10/2014 | Keller et al. | |

OTHER PUBLICATIONS

Miguet, Francis, and Dominique Groleau. "A daylight simulation tool for urban and architectural spaces—application to transmitted direct and diffuse light through glazing." Building and environment 37.8 (2002): 833-843.*
Haines, Eric, and Tomas Akenine-Moller. "Real-time rendering." 2nd. Ed. (2002), pp. 718-719 in Appendix A.*
Schmidt, Thorsten-Walther, et al. "Path-space manipulation of physically-based light transport." ACM Transactions on Graphics (TOG) 32.4 (2013): 129.*

* cited by examiner

*Primary Examiner* — Daniel Hajnik
(74) *Attorney, Agent, or Firm* — Zilka-Kotab, PC

(57) ABSTRACT

A method, system, and computer program product for performing a lighting simulation are disclosed. The method includes the steps of receiving a three-dimensional (3D) model, receiving a set of probes, where each probe specifies a location within the 3D model and an orientation of the probe, and performing, via a processor, a lighting simulation based on the 3D model, the set of probes, and one or more light path expressions. The light path expressions are regular expressions that represent a series of events, each event representing an interaction of a ray at a location in the 3D model.

16 Claims, 7 Drawing Sheets

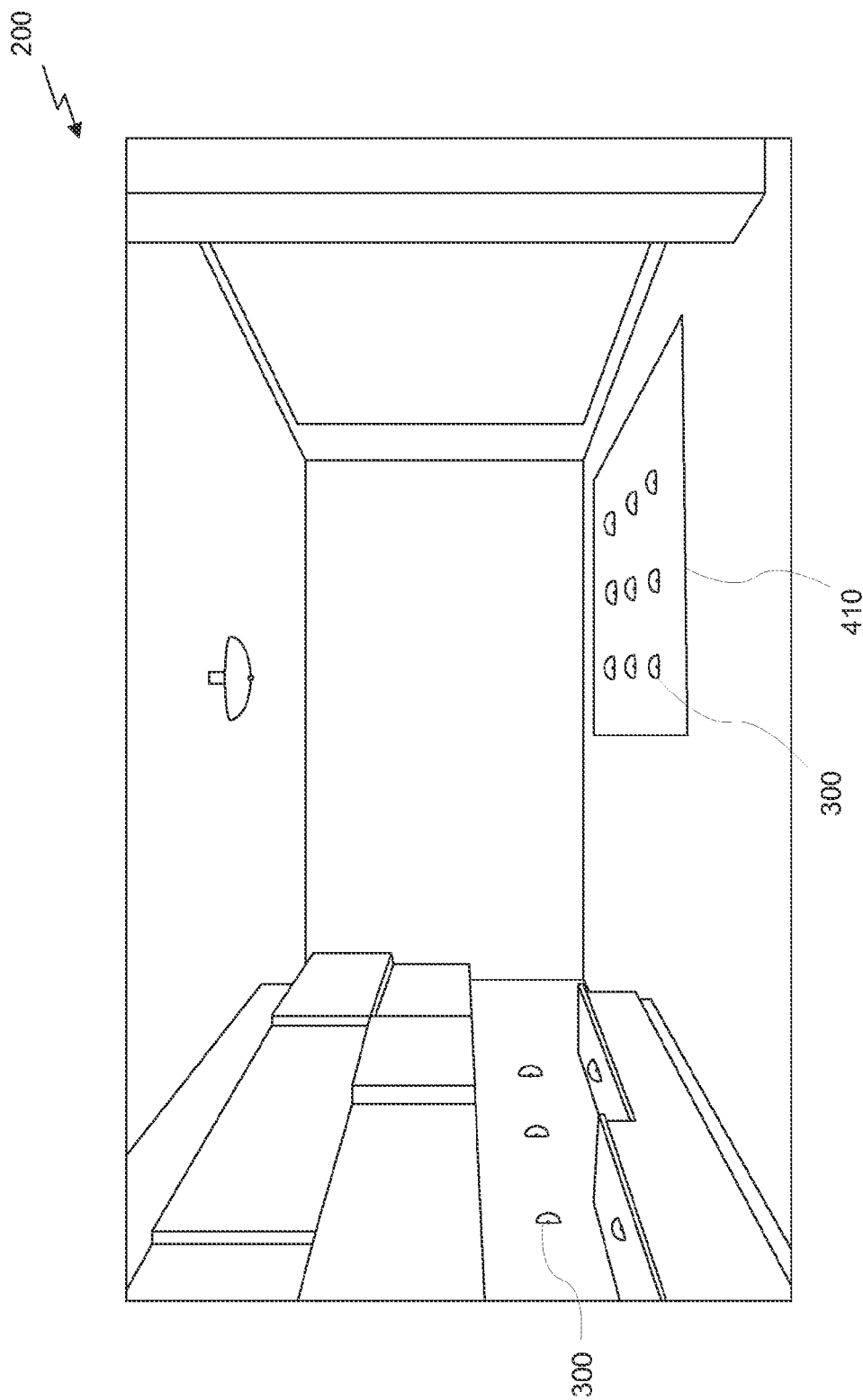

LIGHTING SIMULATION ANALYSIS USING LIGHT PATH EXPRESSIONS

CLAIM OF PRIORITY

This application claims the benefit of U.S. Provisional Application No. 62/035,354 titled "Lighting Simulation Analysis using Light Path Expressions," filed Aug. 8, 2014, the entire contents of which is incorporated herein by reference.

FIELD OF THE INVENTION

The present invention relates to computer-aided drafting (CAD) systems, and more particularly to analysis of lighting simulations performed on building designs.

BACKGROUND

The design of a building has a profound impact on the light levels throughout the building. For example, the amount and location of windows as well as the orientation of the building with respect to the path of the sun can vastly affect the amount of light that enters a particular room. Other design aspects can also affect a room, such as the color and type of paint chosen for the walls, the arrangement and finishes of furniture, and the placement of internal lighting fixtures, to name a few. Daylight levels that are too high can cause glare and discomfort to those occupying the building, while daylight levels that are too low can increase energy costs for artificial lighting.

In order to take lighting conditions into account during the design phase, CAD tools are needed to be able to accurately simulate light transport through the building. These tools may analyze a building model taking into consideration such aspects of structure design, building materials, and the date and time of day. Many conventional tools are configured to perform full lighting simulations to provide some insight into the levels of illumination associated with a given design. However, the complexity of light transport simulation makes it hard to identify and study how and why certain design decisions change the levels of illumination. For example, while conventional tools may use ray-tracing techniques in order to generate an image of a portion of the model with simulated lighting conditions, the conventional tools may not be good at separating the effects between the color of a floor and the color of a paint used for the wall. Instead, a user must run different simulations, generating different images for each combination of materials and then compare the images in order to determine the effects from any one particular combination of design choices. Such techniques are tedious and reduce the efficiency of the architect when designing buildings or other structures. Thus, there is a need for addressing these issues and/or other issues associated with the prior art.

SUMMARY

A method, system, and computer program product for performing a lighting simulation are disclosed. The method includes the steps of receiving a three-dimensional (3D) model, receiving a set of probes, where each probe specifies a location within the 3D model and an orientation of the probe, and performing, via a processor, a lighting simulation based on the 3D model, the set of probes, and one or more light path expressions. The light path expressions are regular expressions that represent a series of events, each event representing an interaction of a ray at a location in the 3D model.

BRIEF DESCRIPTION OF THE DRAWINGS

FIG. 4 illustrates a number of probes associated with a light transport simulation, in accordance with one embodiment;

DETAILED DESCRIPTION

There are various tools for performing architectural lighting simulation. Many of these tools calculate radiance values for various surfaces in the design. For example, the user may choose a particular camera position within the CAD model and the tool may use ray-tracing techniques along with algorithms for simulating light sources and light transport mechanisms (e.g., diffusion, reflection, refraction, transmission, irradiance, scattering, etc.) to calculate color values for a number of pixels that represent an image of the model from the camera position. The process may simulate lighting conditions within the model given the defined light sources. While full lighting simulations, such as described above, are useful for evaluating a given set of design choices, these techniques are not as useful for evaluating the contributions to the levels of lighting provided by different design elements within the model. Typically, an architect will need to manually change each design element individually and then re-run the full light transport simulation based on the updated model in order to evaluate the effect of different design choices (e.g., changing the size, arrangement, or type of windows, etc.). Such simulations take time and a more useful tool for evaluating the contributions of different design elements to a full lighting simulation is desirable.

Figure 1:
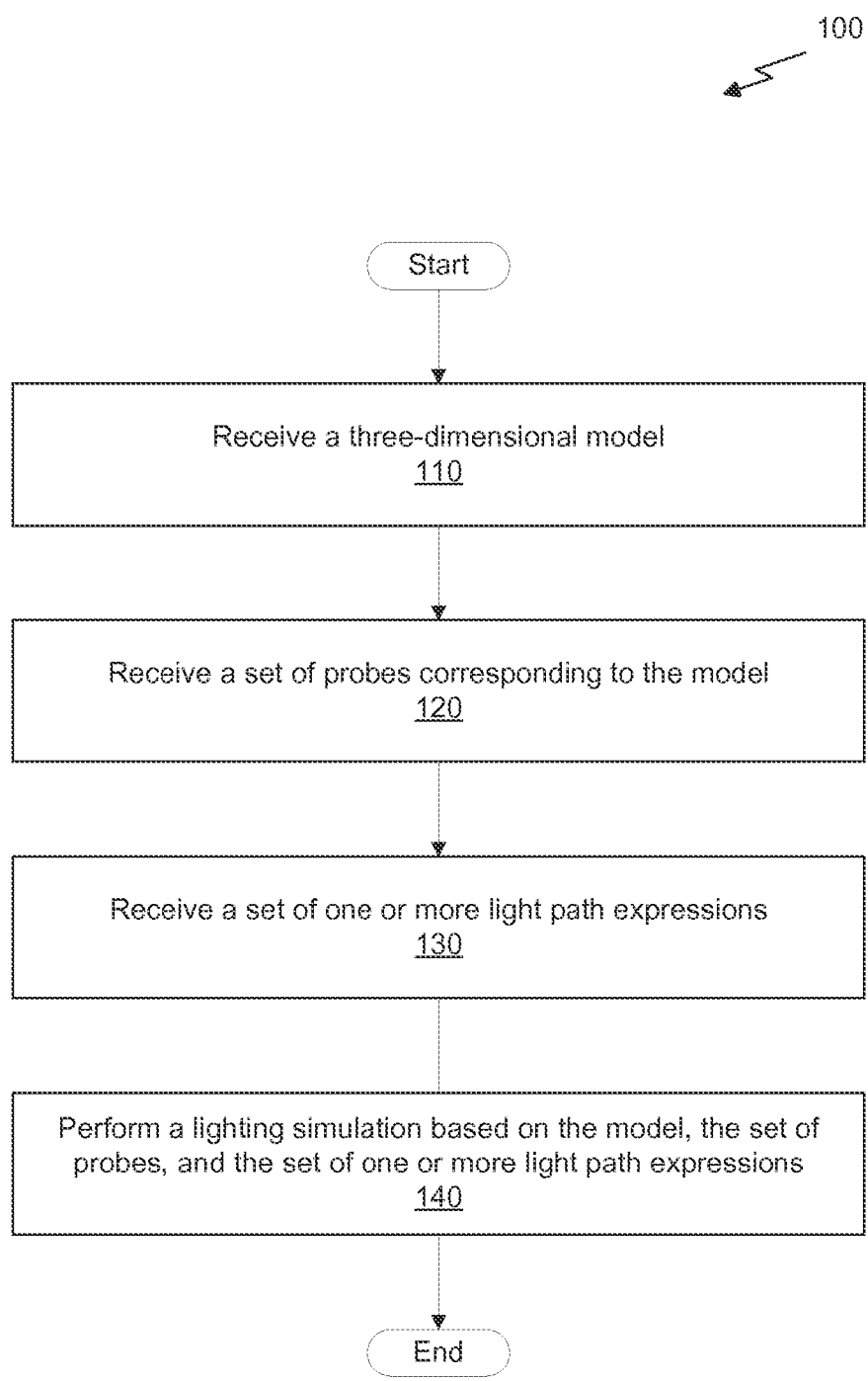
FIG. 1 illustrates a flowchart of a method for performing a lighting simulation analysis of a model using light path expressions, in accordance with one embodiment.

FIG. 1 illustrates a flowchart of a method 100 for performing a lighting simulation analysis of a model using light path expressions, in accordance with one embodiment. At step 110, a three-dimensional model is received as input by a light transport simulation tool. The three-dimensional model may be a CAD model that defines surfaces, objects, materials, light sources, etc. and may be in a format such as a .DWG file format. Of course any format that defines a CAD model is within the scope of the present disclosure. The model may be received in a proprietary format or may be converted from one format into another format (e.g., a .DWG file may be converted into an ASCII text format to be imported into the light transport simulation tool).

At step 120, a set of probes corresponding to the model is received. Each probe is configured to measure illumination at a virtual surface corresponding to a position and direction associated with the probe. The surface may be a visible or invisible surface in the model. In one embodiment, a probe may be defined by a three-coordinate position vector that specifies a location of the probe in the model and a three-coordinate direction vector which specifies an orientation of the virtual surface. The orientation may also be provided as a coordinate frame. The orientation of the virtual surface defines a direction of light associated with the probe and defines an orientation of a hemisphere (or sphere) centered on the location of the probe for generating light transport paths during the simulation.

At step 130, one or more light path expressions are received. The light path expressions may be imported from a library or defined manually by a user. Light path expressions are regular expressions that represent a set of light transport paths between at least one probe and at least one light source. The light path expressions may be used to select subsets of light transport paths when calculating illumination values for a probe during a lighting simulation.

At step 140, a lighting simulation is performed, by a processor, based on the model, the set of probes, and the one or more light path expressions. The light path expressions may select different light transport paths that contribute to at least one illumination value associated with a probe based on a sequence of light interaction types (e.g., diffuse, glossy, specular reflection, transmission, etc.), light sources, or objects in the model that interact with the light transport path, as will be described in more detail below.

A light interaction type refers to a classification of an interaction of a segment of a light transport path (e.g., a ray) at a location within the model. The location may be associated with a surface of a 3D model. For example, when a light transport path is generated from the probe, a ray will be generated from the location of the probe in a particular direction into the model. The light transport simulation will determine an object in the model that intersects the ray. Based on that intersection, one or more light interaction events will be appended to the light path. Each event represents a simulation of the interaction of light at a location within the model and, ultimately, affects the contribution to at least one illumination value of a probe from light emanating from a particular light source.

In performing the light transport simulation, at least one illumination value may be calculated for each probe in the set of probes. For each probe, a Monte Carlo (or quasi Monte-Carlo) light transport simulation is performed. A plurality of light transport paths will be randomly (or pseudo-randomly/quasi-randomly) generated for the probe. Each light transport path may originate at the location of the probe and be directed outward somewhere within the hemisphere or sphere centered on the direction vector associated with the probe. The at least one illumination value is calculated by accumulating contributions from a plurality of light transport paths associated with the probe. Each light transport path is traced backwards starting from the location of the probe and searching for a light source that intersects the light transport path. Once the light transport path has been completed (i.e., by intersecting a light source), the contribution of the light transport path to the at least one illumination value may be calculated. The contribution may be accumulated into the at least one illumination value as long as the light transport path matches at least one light path expression. This process may be optimized by terminating the generation of light transport paths as soon as the light transport paths no longer match any of the light path expressions.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
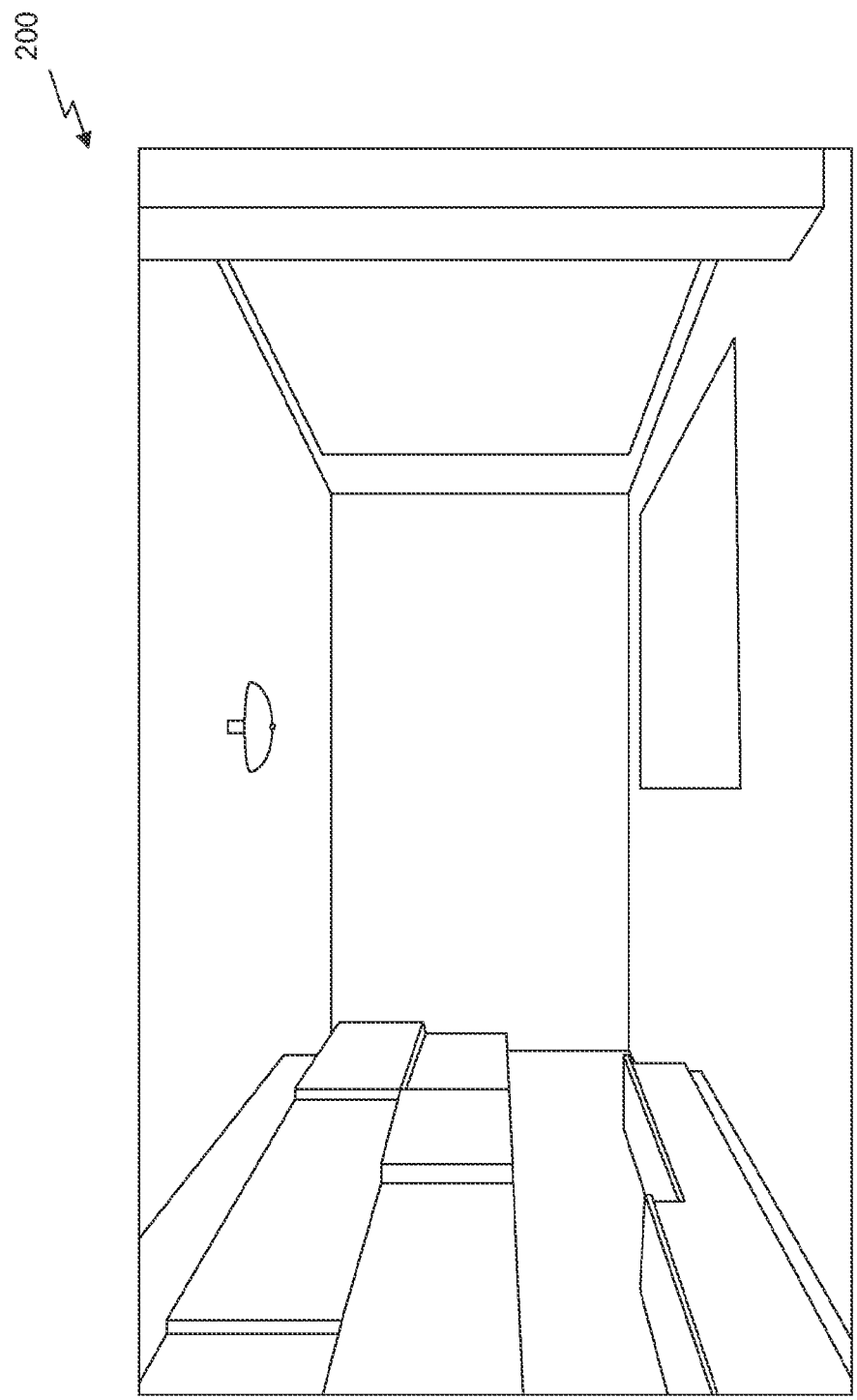
FIG. 2 illustrates a model of a building, in accordance with one embodiment.

FIG. 2 illustrates a model 200 of a building, in accordance with one embodiment. As shown in FIG. 2, the model 200 includes definitions for a plurality of surfaces, such as walls, floors, cabinets, windows, etc. A user may generate the model 200 using a CAD program. The user is also required to assign materials to all surfaces in the model. For example, the user could assign a wood material to cabinets, a tile material to the floor, a glass material to the window, and a matte paint material to the walls. The material properties may include color, absorption, luminosity, reflectivity, a refractive index, scattering, and transmittance which are used for simulating an interaction of rays of light with the surfaces assigned the material properties. The surface may also be associated with a texture map and/or bump map that varies the material properties across different points on the surface. The texture map may include an image applied to the surface such that a given location on the surface corresponds to a pixel in the texture map that specifies a color for that point on the surface. The bump map may specify local variations in the surface normal for a surface. Thus, a single flat surface in the CAD model may actually be represented as a textured three dimensional surface using the bump map such that light transport paths interacting with the surface will behave as if striking a textured surface rather than a flat surface.

In one embodiment, the light transport simulation tool may receive the model 200 in the format utilized by the CAD application. Alternately, the format of the model 200 may be converted from a first format (e.g., .DWG format) to a format utilized by the light transport simulation tool. For example, a .DWG format model 200 may be read and converted into an ASCII text format that is provided as an input to the light transport simulation tool. The ASCII text file may include descriptions for each of the surfaces in the model along with the materials assigned to each of the surfaces.

Figure 3A:
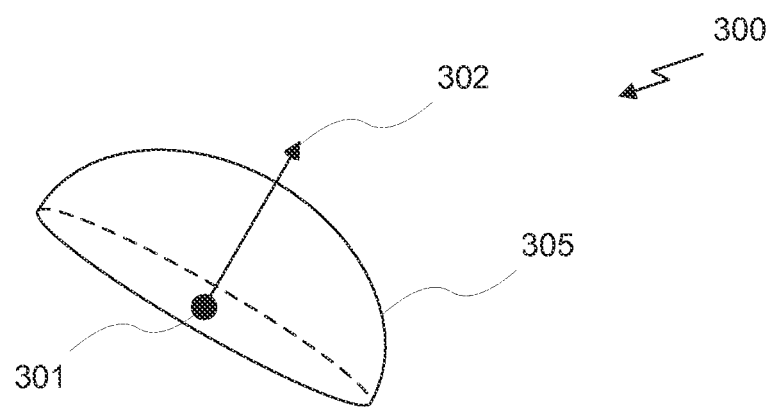
FIGS. 3A and 3B illustrate a probe, in accordance with one embodiment.
Figure 3B:
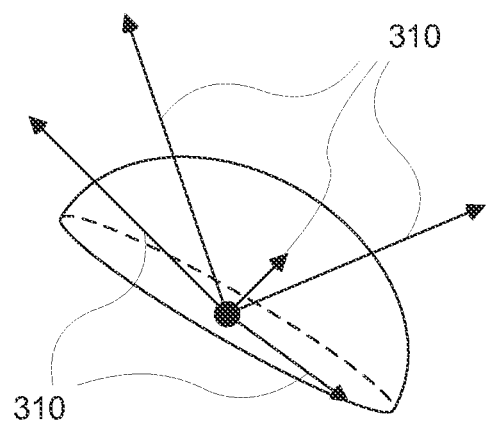

FIGS. 3A and 3B illustrate a probe 300, in accordance with one embodiment. As shown in FIG. 3A, the probe 300 may be defined using a location 301 and a direction vector 302. In one embodiment, the location 301 is specified as a three-coordinate vector <x, y, z> that identifies a location for the probe within the model 200. The direction vector 302 may also be specified as a three-coordinate vector <x, y, z> that identifies an orientation of a hemisphere 305 centered on the location 301. As shown in FIG. 3B, light transport paths 310 emanating from the location 301 of the probe 300, generated during the light transport simulation, may pass through any point on the hemisphere 305. In another embodiment, the orientation of the probe 300 may be specified as a coordinate frame. In yet another embodiment, the orientation of the probe 300 may be specified by two angles that uniquely define the direction vector 302. In some embodiments, it will be appreciated that the direction vector 302 specifies the orientation of a sphere and not a hemisphere. It will also be appreciated that, in some embodiments, the probes 300 may not need to be associated with surfaces and instead may be located freely in space.

FIG. 4 illustrates a number of probes 300 associated with a light transport simulation, in accordance with one embodiment. A user may configure a light transport simulation by specifying a set of probes 300 based on the model 200. For example, a user may add probes 300 to the model 200 by placing the probes 300 on surfaces within the model 200. In one embodiment, the user may place a probe 300 within the model 200 by specifying the location 301 as a position in a coordinate system of the model 200. In another embodiment, the user may place a probe 300 within the model 200 by specifying the location 301 with an input device such as a mouse. As shown in FIG. 4, a user has defined, individually, three probes 300 on a wall of the room facing an opposite window. The user has also defined two additional probes 300 on the counters underneath cabinets. It will be appreciated that, as a default, the direction of the probes 300 may be configured to match a normal of the surface associated with the probes 300. The user may also be assisted in placing probes 300 by programmatically generating the probes 300. For example, probes 300 may be generated by projecting a regular grid onto the surfaces in the model 200 or creating probes by uniformly sampling points on the surfaces.

The light transport simulation tool may also be configured to automatically place probes on a selected surface in a grid pattern. For example, a user may select a surface 410 that represents a rug in a room depicted in the model. The light transport simulation tool may automatically place a number of probes 300 on a regularly spaced grid on the surface. As shown in FIG. 4, nine probes 300 have been automatically arranged in a grid on the surface of the rug. Once the user has defined the set of probes 300 within the model 200, the light transport simulation may be performed. In another embodiment, the lighting simulation tool may receive probes 300 configured to capture the radiance as incident on a sphere. Such probes 300 can later be reused for fast relighting of the scene.

In one embodiment, the light transport simulation may be performed, in part, by rendering the scene using a ray-tracing technique and algorithms for simulating lighting interactions in order to calculate a luminance value for each pixel in an image of the scene. This technique is performed by many conventional lighting simulation tools. However, the results of this technique are not readily evaluated to determine what portion of illumination in the scene is from each individual light source or design element. For example, the scene shown in FIG. 4 includes both a light through a window and a light fixture as distinct sources of light. While conventional techniques may accurately render the scene to show the designer how much illumination will be in the room, it may not readily be apparent how the two light sources affect the illumination individually or to what extent the material choices for the floor, rug, walls, and cabinets affect the illumination of the room. This conventional technique is therefore supplemented by the information supplied by each of the probes using the light path expressions.

In addition to defining the probes 300, the user may also define various light path expressions. Each light path expression is used during the light transport simulation to select or reject light transport paths used to calculate a measured illumination value for a given probe. Light path expressions are regular expressions that represent a series of events, each event representing an interaction of a ray at a location in the model 200. For example, the light path expression may describe a path of light through a scene, starting from a source of light, bouncing around between the objects of the scene and ultimately ending up at the eye. In contrast, light path expressions may also describe a path of light from a probe 300 to a light source, with zero or more surfaces included in the light transport path between the probe 300 and the light source. The paths that light takes through a scene are called light transport paths and represent a simulation of rays of light as the rays are reflected off zero or more objects in the scene.

Each event (i.e., an interaction of light with a surface) associated with a light transport path is described by a type (e.g., emission, refraction, or reflection), a mode of scattering (e.g., diffuse, glossy, or specular), and an optional handle. A full event may be described using an event descriptor that is represented in a <t m h> format where a component t is the type of the event, a component m is the scattering mode, and a component h is the handle (in single quotes; e.g., 'foo'), which may be omitted. Handles may be used to indicate a particular object in the model 200 associated with the event (e.g., a particular surface, a particular light source, a particular probe, etc.). Handles may also be used to define a set of objects, such as all surfaces associated with a table or one of three different light sources included in a single light fixture. The light path expression may be generated by concatenating a set of event descriptors in a string that represents a series of events from the probe to the light source in the light transport path.

A wildcard symbol ('.') and common operators (e.g., '*', '+', and '|', etc.) may be utilized within the light path expression. The '.' symbol may be used as a wildcard for any component of the event descriptor (inside the brackets < >) to indicate that any of the types, modes, or handles will match the respective component, or as a stand-in for a complete symbol, indicating that any interaction will match. The '*' operator may be utilized within a light path expression to indicate that any number of repetitions (zero to infinite) of the previous event may be included within the light transport path. The '+' operator may be utilized within a light path expression to indicate that one or more repetitions (one to infinite) of the previous event may be included within the light transport path. Additional operators are described in Table 1, as shown below.

For example, an illustration of a light path expression is as follows:

$$I.*L \tag{LPE 1}$$

Light Path Expression (LPE) 1, shown above, includes a symbol 'I', which indicates that the event is for an irradiance marker (i.e., a probe 300), and a symbol 'L', which indicates that the event is for a light source. In other words, LPE 1 matches any light transport paths that originate at a probe 300 and terminate at a light source, including light transport paths that interact with zero or more scene elements between the probe 300 and the light source. It will be appreciated that LPE 1 is not a very useful expression because it will match all light transport paths that begin at a probe 300 and intersect a light source in the model 200, which are all light transport paths that will contribute to the illuminance value for a particular probe. However, LPE 1 can be modified with other events in order to filter out specific contributions to an illumination value. For example, LPE 2, as shown below, may be used to select the contributions from only those light transport paths that intersect a particular light source.

$$I.*L\text{'light1'>} \tag{LPE 2}$$

In contrast with LPE 1, LPE 2 only matches those light transport paths that intersect the light source identified by the handle 'light1'. For example, in model 200, there are two light sources, the artificial light from the light fixture located on the ceiling and the ambient light from the window, which may be modeled as an area light source matching the surface of the window or, more accurately, an area or point light source beyond the window that is represented at an approximate location of the sun or moon in relation to the window. The user may assign a handle to a light source associated with the light fixture within the model. The handle assigned to that light source can then be used to only select any light transport paths that intersect with that light source such that the at least one illumination value calculated for each probe 300 is only related to those contributions from that particular light source and ignores contributions from other light sources. Again, the wildcard '.*' indicates that any number of events can be included in the light transport path between the probe 300 and the light source. In contrast LPE 3 may be used to only select contributions from the light source that are caused by direct illumination at the probe, and LPE 4 may be used to only select contributions from the light source that are caused by indirect illumination at the probe 300.

$$I<L\text{'light1'}>\quad\quad\quad\quad\quad\quad\text{(LPE 3)}$$

$$I.+<L\text{'light1'}>\quad\quad\quad\quad\quad\quad\text{(LPE 4)}$$

In LPE 3, the expression does not include a wildcard symbol between the symbol for the probe 300 and the symbol for the light source. Thus, only those light transport paths that are the result of a ray that emanates from the probe and directly intersects the light source ('light1') are selected by LPE 3. In contrast, LPE 4 includes the '.+' wildcard symbol, which requires at least one event between the symbol for the probe 300 and the symbol for the light source. In other words, the light transport path is required to interact with at least one surface in the model 200 between the probe 300 and the light source and, therefore, the contribution related to that light transport path is the result of indirect illumination.

Other types of light path expressions may enable a designer to focus on particular light transport paths. For example, LPE 5, shown below, may be utilized in order to select light transport paths that result only in a glossy reflection from surfaces having the handle 'table1'.

$$I<RG\text{'table1'}>.*L\quad\quad\quad\quad\quad\quad\text{(LPE 5)}$$

Table 1 illustrates the grammar for light path expressions, in accordance with one embodiment of the light transport simulation tool.

TABLE 1

| | |
|---|---|
| L | light |
| E | eye |
| R | reflection (type) |
| T | transmission (type) |
| V | volume interaction (type) |
| D | diffuse (mode) |
| G | glossy (mode) |
| S | specular (mode) |
| 'h' | handle h |
| <type mode handle> | event |
| Lp | point light (type) |
| La | area light (type) |
| Le | environment or background light (type) |
| Lm | matte lookup (type) |
| <light-type light-handle mode handle> | light source (full form) |
| <I h> | irradiance marker (probe) |
| type | abbreviation for <type..> |
| mode | abbreviation for <.mode.> |
| handle | abbreviation for <..handle> |
| I | abbreviation for <I.> |
| . | match anything |

TABLE 1-continued

| | |
|---|---|
| [A . . . ] | match any element in set |
| [^A] | match all but A |
| AB | A followed by B |
| A\|B | A or B |
| A? | zero or one A(s) |
| A* | zero or more A(s) |
| A+ | one or more A(s) |
| A{n} | a sequence of n A(s) |
| A{n, m} | n to m occurrences of A |
| ( . . . ) | grouping |
| ^expression | complement of expression |
| expression$_1$ & expression$_2$ | match both expressions |
| name: expression | assign expression to name |
$name | use value of name |

In one embodiment, a processor of a data processing device (e.g., a computer) is configured to execute an application for performing the light transport simulation. The application may be referred to herein as the light transport simulation tool. The light transport simulation tool may be configured by a user by selecting a model 200 on which a light transport simulation is to be performed. The user may also import a set of probes associated with the model 200 or may define a set of probes manually using the light transport simulation tool. The user may also define one or more light path expressions associated with the set of probes using the light transport simulation tool. Once the user has defined the inputs to the light transport simulation, the simulation may be run.

The processor may be configured to perform the light transport simulation by calculating at least one illumination value for each of the probes 300 associated with the model 200. In one embodiment, for each probe 300, the light transport simulation tool generates a number of light transport paths that originate at the probe 300. The number of light transport paths may be generated using a Monte Carlo or quasi-Monte Carlo method. In other words, the first ray of each of the plurality of light transport paths is generated from the location of the probe 300 in a random, pseudo-random, or quasi-random direction that is restricted to the hemisphere 305 (or sphere) associated with the probe 300. The processor may then identify a light source or surface in the model 200 that intersects the ray, generate additional rays, and calculate a contribution to the at least one illumination value for each intersection point in the light transport path.

Figure 5:
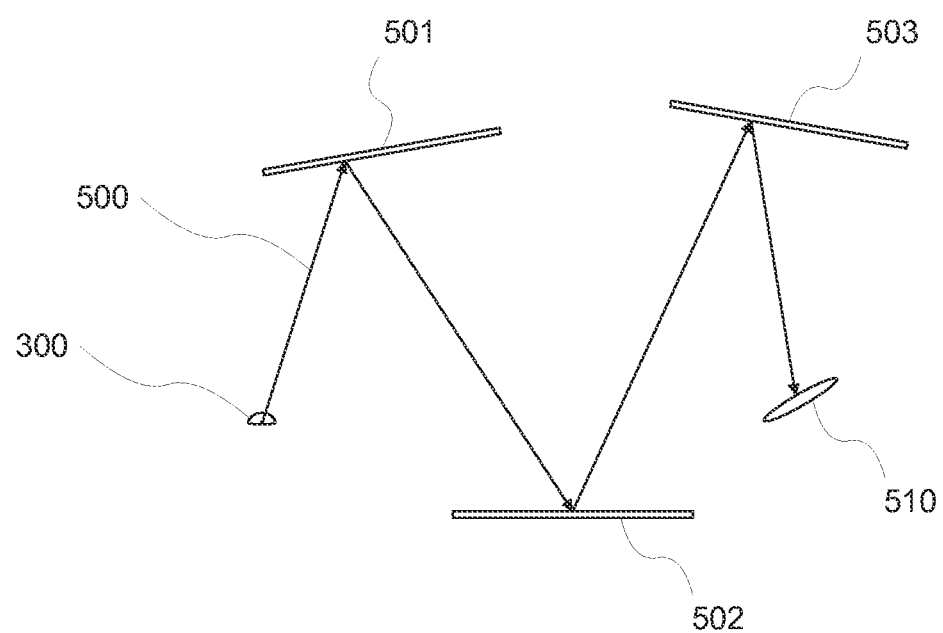
FIG. 5 illustrates a light transport path generated by the light transport simulation tool, in accordance with one embodiment.

FIG. 5 illustrates a light transport path 500 generated by the light transport simulation tool, in accordance with one embodiment. As shown in FIG. 5, the light transport path 500 originates at the probe 300 and includes four segments (i.e., rays), each segment intersecting either a surface or light source in the model 200. A first ray is cast from the probe 300 to a first surface 501; a second ray is cast from the first surface 501 to a second surface 502; a third ray is cast from the second surface 502 to a third surface 503; and a fourth ray is cast from the third surface 503 to a light source 510.

The light transport simulation tool calculates a contribution to the at least one illumination value for the probe 300 corresponding to the light transport path 500. Multiple contributions associated with multiple light transport paths generated for the probe 300 may be accumulated to determine the at least one illumination value for the probe 300. A contribution corresponding to the light transport path 500 may be calculated by the processor by simulating various light transport mechanisms at each intersection of the light transport path 500 with a surface in the model 200.

For example, the light source 510 may be configured to emit light of a certain color (or spectrum of various frequencies) and intensity along the ray going from the light source 510 to the surface 503. The light transport simulation tool is configured to simulate the light transport mechanism at the intersection of the ray with the surface 503 to determine a color and intensity of light that is reflected to the surface 502. The color and intensity of light reflected to surface 502 from surface 503 may be different than the color and intensity of light emitted from the light source 510. The material properties of the surface 503 may affect the properties of the reflected light. In one example, the color of the surface and an absorption property of the surface may be utilized to determine the color and intensity of the light reflected to the surface 502.

The technique described above is repeated iteratively for each segment of the light transport path 500 from the light source 510 to the probe 300 in order to calculate a contribution of the light transport path 500 to the at least one illumination value for the probe 300. Again, the contributions from a plurality of light transport paths generated by the light transport simulation tool may be accumulated to determine at least one total illumination value for the probe 300. Various algorithms for simulating the type of interactions of light with surfaces (e.g., emission, reflection, refraction, etc.) are well known in the art and may not only affect how the contribution value is calculated, but also a direction for each ray generated when determining the light transport path 500.

It will be appreciated that the generation of light transport paths has been presented by way of example and not limitation. The generation of light transport paths is not restricted to the ray-tracing technique shown herein. In contrast, the generation of light transport paths may be performed via bi-directional path tracing techniques and photon mapping techniques as well as subsets or combinations of bi-directional path tracing, photon mapping, or Metropolis light transport techniques. For example, computing the contributions to a probe may be established by a light tracer, where instead of starting light transport paths at the location of the probe, vertices of light transport paths starting at the light sources are connected to the location of a probe. In the same spirit, events may not be limited to interactions with surfaces. In fact, events may include scattering events in volumes such as fog, smoke, or translucent materials.

The light transport simulation tool may generate the light transport path 500 one segment at a time, working backwards from the probe 300 to a light source 510. In other words, the light transport simulation tool may generate a first ray that originates at the probe 300 and is emitted outwards from the probe 300 in a direction that corresponds with the hemisphere 305 for the probe. Again, the direction of the first ray may be selected randomly or pseudo-randomly based on a Monte Carlo technique or quasi-randomly based on a quasi-Monte Carlo technique. The ray is intersected with the surfaces of the model 200 to determine a closest surface in the model 200 that intersects the ray. At the point of intersection, the light transport simulation tool may simulate an event at the intersection of the ray and the surface.

A type of the event may be determined based on the material assigned to the surface. For example, the material may specify a color, an absorption value, and a reflectivity associated with the surface. Simulating the event may generate an additional ray that originates at the intersection point between the previous ray and the surface. The processor may then identify a new surface in the model 200 that intersects the new ray and another event may be simulated and added to the light transport path. The process is repeated until a ray intersects a light source or the simulation determines that no light from any light source in the light transport path would be able to reach the probe (e.g., based on the cumulative surface properties of all surfaces included in the light transport path up until the current ray). For example, material properties for the first n surfaces intersected in the light transport path may dictate that all light from the light transport path directed at the probe would be absorbed before reaching the probe.

If the contribution of illumination at the probe from the light reflected off the surface may be based on two or more different types (e.g., refraction and reflection) and/or modes of reflection (e.g., specular and diffuse), then the light transport path will randomly, pseudo-randomly, or quasi-randomly select one specific event (e.g., a combination of a particular type and mode) for that particular interaction of the light transport path with the surface. For example, if light reflected from the surface may be based on both diffuse and specular reflection, then the contribution associated with the particular light transport path will only include the contribution of the illumination from one of the two modes of reflection, and the choice between the two will be randomly, pseudo-randomly, or quasi-randomly selected as the light transport path is generated. The type of event may affect a direction of the next ray generated in the light transport path and may also affect the contribution of the light transport path 500 to the at least one illumination value. For example, diffuse reflection may cause a new ray to be generated in any direction from the surface. In contrast, specular or glossy reflection may cause a new ray to be generated in a particular direction based on the previous ray and the surface normal at that location.

While the light transport path is being generated, the light transport path 500 may be compared against the light path expressions. If none of the light path expressions matches the current light transport path 500, then the further processing of that light transport path 500 may be terminated, because the contribution of that light transport path 500 will not be included in any of the final illumination values for the probe 300. However, if at least one of the light path expressions matches the current light transport path 500, then the processing of the light transport path 500 may continue as additional events are added to the light transport path 500.

The light transport paths generated by the light transport simulation tool may be utilized to study one specific lighting situation or, by repeating the simulation for different conditions (e.g., weather, time settings, etc.), the output can be combined to calculate several well-established light analysis measures such as "daylight autonomy".

The light path expressions allow for a detailed assessment of the lighting situation. In one embodiment, different sets of light path expressions may be used to calculate different illumination values for a probe substantially simultaneously. For example, a first set of light path expressions may be used to select a subset of contributions corresponding to the set of light transport paths that match at least one light path expression in the first set of light path expressions. Simultaneously, a second set of light path expressions may be used to select a subset of contributions corresponding to the set of light transport paths that match at least one light path expression in the second set of light path expressions. The contributions may be calculated once for each light transport path and then accumulated into different illumination values based on different sets of light path expressions. This enables a user to run one light transport simulation but evaluate different illumination values based on the defined sets of light path expressions.

A second application of the method is caching or the baking of light into light maps (i.e., storing illumination values in light maps) as used for accelerated rendering in games. Here, regular expressions can be used in a similar way to select which light transport paths are baked into what light map. This means that regular expressions also can be used to select the support (i.e., texture) and basis functions, such as modes of the spherical harmonics, wavelets, or other popular representations such as reflection and environment maps used for representing radiance. Baking of light into light maps refers to adding texture maps associated with surfaces in the model 200 based on results of the light transport simulation. For example, the one or more illumination values calculated for the set of probes can be stored using one or more additional texture maps. The additional texture maps may then be used to render the model 200 with a more accurate lighting representation without having to dynamically run the light transport simulation.

In one embodiment, the contribution of a particular light transport path is calculated based on the application of path space filtering techniques. This technique averages multiple contributions of different light transport paths to reduce the variance of the contribution of each single light transport path. In this technique the contribution value is calculated by sampling material properties for a surface at multiple locations on the surface proximate the intersection point between the ray and the surface. By filtering material properties at multiple points along each surface intersected by a light transport path, a more accurate estimate for the at least one illumination value for the probe can be made while sampling a much smaller number of light transport paths. All of the above computation of illumination values associated with probes can be greatly accelerated by applying the principles of path space filtering. In fact, path space filtering enables a reduction in the variance within irregular clouds of point measurements, as long as the point clouds are sufficiently dense.

Figure 6:
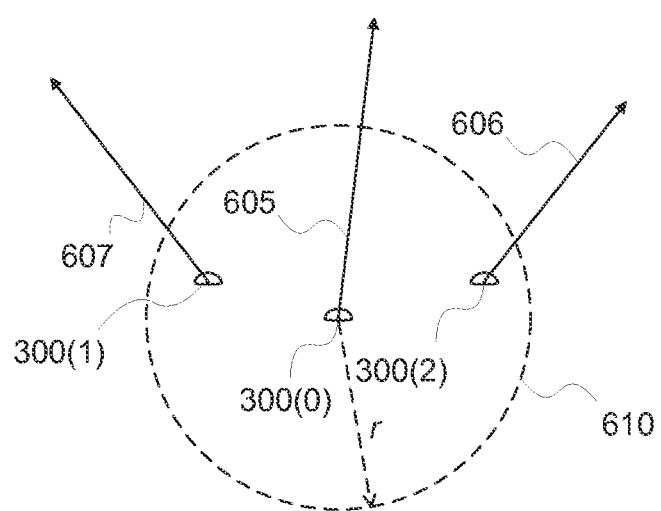
FIG. 6 illustrates the application of path space filtering to the light transport simulation, in accordance with one embodiment.

FIG. 6 illustrates the application of path space filtering to the light transport simulation, in accordance with one embodiment. Instead of calculating the contribution for each light transport path based on a single intersection point at each surface, the contribution may be calculated by blending the simulation of the light interaction at each surface over a plurality of proximate probe locations. As shown in FIG. 6, a number of light transport paths 605, 606, and 607 are started from probes 300(0), 300(1), and 300(3), respectively.

A contribution for a probe 300(0) may be calculated based on an average contribution of all light transport paths for one or more probes 300 located inside of a sphere 610 with a radius r centered on the location of a probe 300(0). The multiple contributions across all sample points may be blended (e.g., averaged, etc.) to arrive at a filtered contribution to the probe 300(0) located at the center of the sphere 610. The contribution calculated for the light transport path 605 is therefore filtered based on contributions from multiple light transport paths (e.g., 605, 606, 607, etc.) being blended in close proximity to each other. It will be appreciated that the radius of the sphere 610 may decrease as a number of samples (e.g., light transport paths) for each probe increases. Path space filtering techniques also work across texture edges. In one embodiment, texture maps utilized with path space filtering techniques may be represented in a Ptex format.

In summary, the techniques described herein can be considered a generalized virtual camera that allows for measuring, caching, or baking of illumination information. Regular expressions are used for selecting light transport paths, support, and basis functions. The measurements (i.e., calculated illumination values) can be stored in point clouds, voxels, textures, or micro-polygon structures. Exploiting spatial coherency of the single measurements, path space filtering can dramatically enhance efficiency. If the techniques are utilized with physically-based simulation, predictive simulations of measurements can be obtained.

Compared to conventional techniques, the described techniques allow for efficient illumination analysis on arbitrary (i.e., virtual) surfaces with minimal user assistance. The use of multiple light path expressions with object handles allows for detailed analysis of different lighting interactions with minimal effort/overhead.

Figure 7:
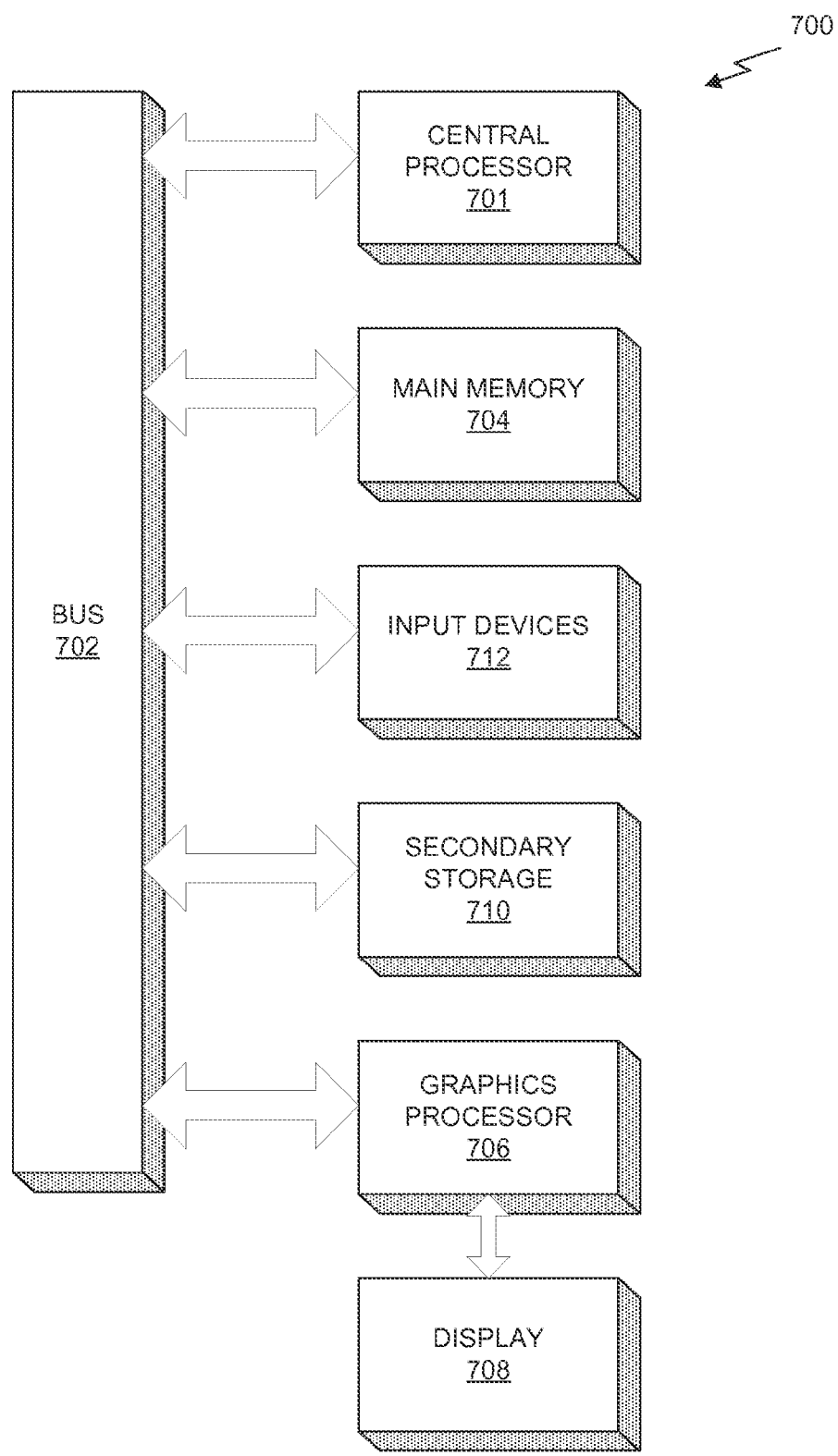
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The semiconductor platform may be implemented on a reconfigurable logic or a field programmable gate array (FPGA).

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a three-dimensional (3D) model;
   receiving a set of probes, wherein each probe includes a first vector that specifies a location within the 3D model and a second vector that specifies an orientation of the probe;
   performing, via a light transport simulation tool executed by a processor, a light transport simulation based on the 3D model, the set of probes, and one or more light path expressions,
   wherein performing the light transport simulation comprises, for each probe in the set of probes:
      generating a number of light transport paths that are associated with the probe,
      selecting a subset of light transport paths in the number of light transport paths based on a set of light path expressions in the one or more light path expressions, and
      calculating a contribution to at least one illumination value for the probe for each light transport path in the subset of light transport paths, wherein calculating the contribution to the at least one illumination value for the probe comprises applying a path space filtering technique that includes calculating a filtered contribution for the probe by blending a plurality of contributions from a plurality of probes located within a sphere centered at the location of the probe.

2. The method of claim 1, wherein each light path expression in the one or more light path expressions comprises a regular expression that represents a series of events, each event representing an interaction of a ray at a location in the 3D model.

3. The method of claim 1, further comprising storing at least one illumination value for accelerating lighting calculations.

4. The method of claim 1, wherein the at least one illumination value for each probe in the set of probes is stored in point clouds, voxels, textures, or micro-polygon structures.

5. The method of claim 1, wherein the processor comprises a graphics processing unit and multiple light transport paths are generated in parallel for each probe in the set of probes.

6. The method of claim 1, wherein each light path expression in the one or more light path expressions is generated by concatenating a set of event descriptors in a string.

7. The method of claim 6, wherein the string may include at least one of a wildcard symbol and an operator defined in a grammar for the light path expressions.

8. A non-transitory computer-readable storage medium storing instructions that, when executed by a processor, cause the processor to perform steps comprising:
   receiving a three-dimensional (3D) model;
   receiving a set of probes, wherein each probe includes a first vector that specifies a location within the 3D model and a second vector that specifies an orientation of the probe; and
   performing, via a light transport simulation tool executed by the processor, a light transport simulation based on the 3D model, the set of probes, and one or more light path expressions,
   wherein performing the light transport simulation comprises, for each probe in the set of probes:
      generating a number of light transport paths that are associated with the probe,
      selecting a subset of light transport paths in the number of light transport paths based on a set of light path expressions in the one or more light path expressions, and
      calculating a contribution to at least one illumination value for the probe for each light transport path in the subset of light transport paths, wherein calculating the contribution to the at least one illumination value for the probe comprises applying a path space filtering technique that includes calculating a filtered contribution for the probe by blending a plurality of contributions from a plurality of probes located within a sphere centered at the location of the probe.

9. The non-transitory computer-readable storage medium of claim 8, wherein each light path expression in the one or more light path expressions comprises a regular expression that represents a series of events, each event representing an interaction of a ray at a location in the 3D model.

10. The non-transitory computer-readable storage medium of claim 8, wherein each light path expression in the one or more light path expressions is generated by concatenating a set of event descriptors in a string.

11. The non-transitory computer-readable storage medium of claim 10, wherein the string may include at least one of a wildcard symbol and an operator defined in a grammar for the light path expressions.

12. A system, comprising:
   a processor configured to:
      receive a three-dimensional (3D) model,
      receive a set of probes, wherein each probe includes a first vector that specifies a location within the 3D model and a second vector that specifies an orientation of the probe, and perform, via a light transport simulation tool executed by the processor, a light transport simulation based on the 3D model, the set of probes, and one or more light path expressions, wherein performing the light transport simulation comprises, for each probe in the set of probes:

generating a number of light transport paths that are associated with the probe, selecting a subset of light transport paths in the number of light transport paths based on a set of light path expressions in the one or more light path expressions, and calculating a contribution to at least one illumination value for the probe for each light transport path in the subset of light transport paths, wherein calculating the contribution to the at least one illumination value for the probe comprises applying a path space filtering technique that includes calculating a filtered contribution for the probe by blending a plurality of contributions from a plurality of probes located within a sphere centered at the location of the probe.

13. The system of claim 12, wherein each light path expression in the one or more light path expressions comprises a regular expression that represents a series of events, each event representing an interaction of a ray at a location in the 3D model.

14. The system of claim 12, wherein the processor comprises a graphics processing unit and multiple light transport paths are generated in parallel for each probe in the set of probes.

15. The system of claim 12, wherein each light path expression in the one or more light path expressions is generated by concatenating a set of event descriptors in a string.

16. The system of claim 15, wherein the string may include at least one of a wildcard symbol and an operator defined in a grammar for the light path expressions.

* * * * *